United States Patent
Henry et al.

(10) Patent No.: US 6,592,375 B2
(45) Date of Patent: Jul. 15, 2003

(54) METHOD AND SYSTEM FOR PRODUCING ENGINE SOUNDS OF A SIMULATED VEHICLE

(75) Inventors: Michael L. Henry, Fremont, CA (US); Mark L. Gruber, San Jose, CA (US); Peter W. Mokris, Fremont, CA (US)

(73) Assignee: Midway Games West Inc., Milpitas, CA (US)

( * ) Notice: Subject to any disclaimer, the term of this patent is extended or adjusted under 35 U.S.C. 154(b) by 222 days.

(21) Appl. No.: 09/780,249

(22) Filed: Feb. 9, 2001

(65) Prior Publication Data

US 2002/0110788 A1 Aug. 15, 2002

(51) Int. Cl.7 ............ G09B 19/04; G09B 19/16
(52) U.S. Cl. ............ 434/62; 434/29; 434/69; 273/442; 381/71.4
(58) Field of Search ............ 434/29, 30, 69, 434/307 R; 273/148 B; 463/30, 36; 446/404; 601/47, 49; 312/223.2; 381/61, 71.4, 86

(56) References Cited

U.S. PATENT DOCUMENTS

| | | | |
|---|---|---|---|
| 3,913,245 A | * 10/1975 | McCanney | 434/48 |
| 4,023,566 A | * 5/1977 | Martinmaas | 601/47 |
| 4,960,117 A | 10/1990 | Moncrief et al. | |
| 5,044,956 A | 9/1991 | Behensky et al. | |
| 5,097,821 A | * 3/1992 | Eakin | 601/47 |
| 5,143,055 A | * 9/1992 | Eakin | 601/47 |
| 5,168,178 A | 12/1992 | Allen et al. | |
| 5,275,565 A | 1/1994 | Moncrief | |
| 5,618,178 A | * 4/1997 | Copperman et al. | 434/62 |
| 5,633,993 A | * 5/1997 | Redmann et al. | 345/419 |
| 5,748,748 A | * 5/1998 | Fischer et al. | 381/71.4 |
| 5,784,473 A | * 7/1998 | Ferren | 381/86 |
| 5,820,442 A | * 10/1998 | Helder | 446/404 |
| 5,857,986 A | * 1/1999 | Moriyasu | 601/49 |
| 5,921,780 A | * 7/1999 | Myers | 434/69 |
| 5,988,314 A | 11/1999 | Negishi | |
| 6,275,590 B1 | * 8/2001 | Prus | 381/61 |

FOREIGN PATENT DOCUMENTS

JP 404152395 A * 5/1992

* cited by examiner

Primary Examiner—Joe H. Cheng
(74) Attorney, Agent, or Firm—Knobbe, Martens, Olson & Bear LLP

(57) ABSTRACT

A vehicle simulation system includes a sound resonant chamber assembly for simulating audio sounds representative of the sounds produced during the operation of the simulated vehicle, comprising a speaker and a sound resonant tube attached to the speaker for enhancing and directing the audio sounds.

13 Claims, 3 Drawing Sheets

METHOD AND SYSTEM FOR PRODUCING ENGINE SOUNDS OF A SIMULATED VEHICLE

BACKGROUND OF THE INVENTION

1. Field of the Invention

The invention generally relates to vehicle simulators and, more particularly, is concerned with realistically simulating to the user the sound of the vehicle as it moves within the simulated universe.

2. Description of the Related Art

Vehicle simulators and arcade games utilizing video displays have been available to the public for some time, but with the passage of time, the simulators and video arcade games have become ever more sophisticated and realistic. In many of today's vehicle simulators and arcade video games it is desired to immerse the driver in a particular environment, for example, by placing the driver in a realistic auto cockpit with a video screen presenting a road or race course with realistic racing sounds.

Great strides have been made in improving the quality of the simulation. The physical layout of a typical driving game can include clutch, brake and gas pedals, a gearshift and a steering wheel to make the driver feel as if he or she is in a real auto cockpit. The driver is provided with a video display having a realistic three-dimensional graphical representation of the driving environment. But less has been done to improve the sound quality of the arcade game beyond providing stereo sound and multiple speakers.

Consequently, a need exists for realistic vehicle simulators and arcade games that accurately reproduce the real life sounds that accompany the displayed visual images in order to capture the driver's imagination and increase the quality of the driver's experience.

SUMMARY OF THE INVENTION

The aforementioned needs are satisfied by the invention which includes a vehicle simulation system including a sound resonant chamber system for simulating the audio sounds representative of the sounds produced during the operation of the simulated vehicle, including a seat, wherein a user of the simulated vehicle sits during operation of the simulated vehicle, multiple input devices corresponding to input devices of the vehicle simulated by the vehicle simulation system, a computer for receiving input signals from the input devices; a control process executed by the computer for selectively converting the input signals into a plurality of control output signals, including audio sounds, wherein the control output signals correspond to events occurring during operation of the simulated vehicle in the simulated universe, and a sound resonant chamber assembly including a speaker and a sound tube attached to the speaker for directing the audio sounds.

The invention further includes a method of realistically producing sounds representative of engine conditions produced during the operation of a simulated vehicle in a simulated driving game, including providing a plurality of input devices for controlling the operation of the simulated vehicle, determining position information of the simulated vehicle in a simulated environment, displaying position information with a view of the simulated environment as seen from said simulated vehicle on a video display to the user, producing sound signals representing engine conditions during operation of said simulated vehicle in said simulated environment, and directing the sound signals through a sound chamber to provide a realistic sound which is representative of engine conditions produced during operation of a corresponding actual vehicle and in a corresponding actual universe.

These and other objects and features of the invention will become more fully apparent from the following description and appended claims taken in conjunction with the accompanying drawings.

DETAILED DESCRIPTION OF THE INVENTION

Reference is now made to the drawings wherein like numerals refer to like parts throughout.

Figure 1:
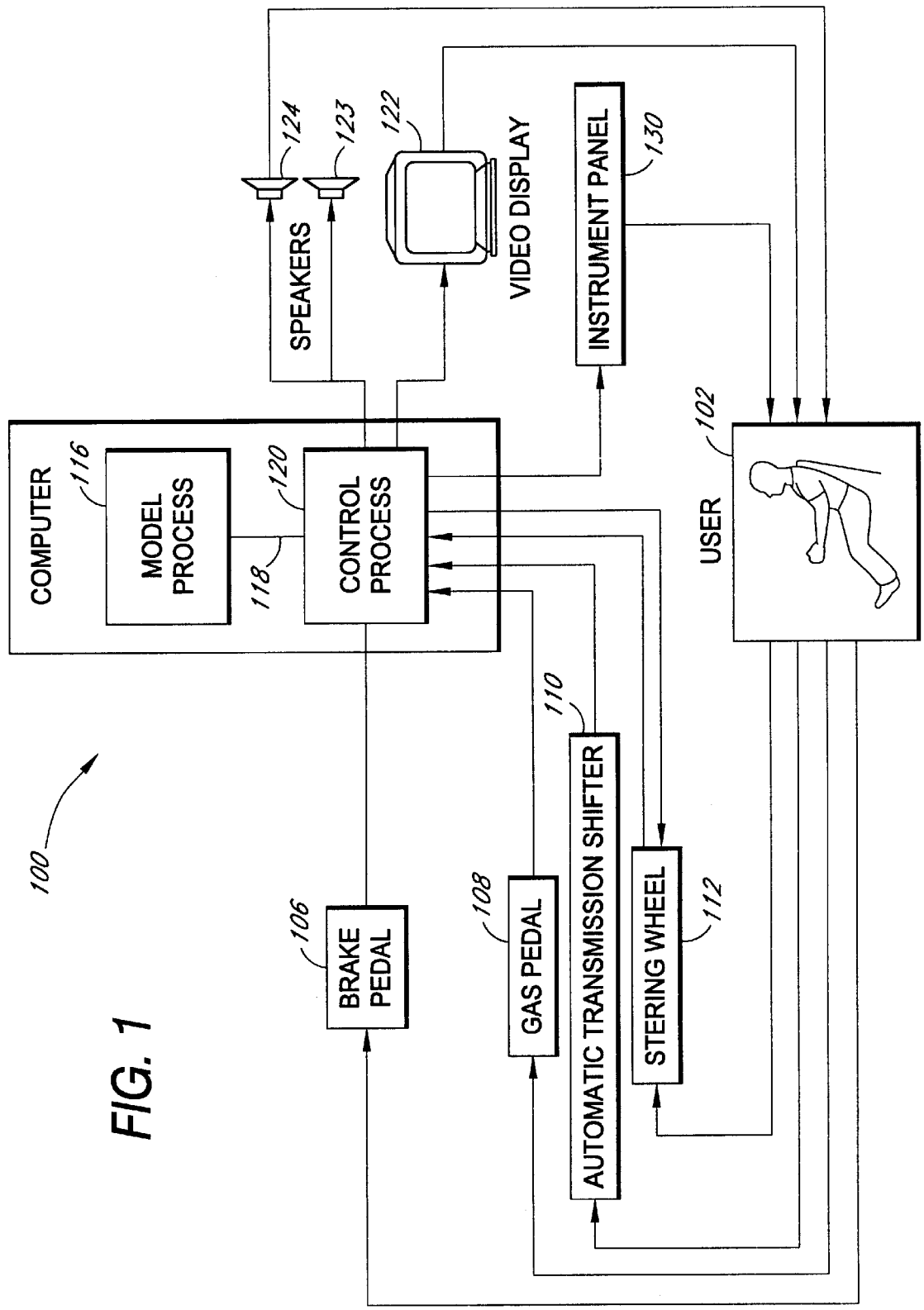
FIG. 1 is a block diagram of one preferred arcade game of the invention.

FIG. 1 shows one preferred embodiment of a simulated driving system 100 of the invention. The simulated driving system 100 is operated by a user or driver 102 (shown schematically), who desires to engage in a simulated driving experience. It should be understood that the simulated driving system 100 as hereinafter described is applicable to any type of vehicle that is operated by a human. Also, the embodiment of the simulated driving system 100 as presented in the following Figures and description is presented as an arcade game for racing. However, the invention includes a realistic sound production system that is easily generalized to simulated driving systems for all kinds of simulated vehicles and types of driving.

In FIG. 1, the user 102 preferably sits in a booth or housing (not shown) such as the one described in U.S. Pat. No. 4,960,117, entitled "Rear Entry Booth and Adjustable Seat Apparatus for a Sit-Down Arcade Video Game," which is hereby incorporated by reference. In that way, distractions are minimized and the user 102 can concentrate on the simulated driving system 100. The sitting position also better simulates the actual conditions associated with driving a car.

In the simulated driving system 100, the user 102 depresses a brake pedal 106 and gas pedal 108 in the customary manner. In addition, a gearshift 110 is manipulated by the user 102 to maximize acceleration and deceleration for the given velocity of the vehicle as simulated by the simulator 100. A steering wheel 112 is turned by the user 102 so as to guide the simulated vehicle in the desired direction of travel.

The mechanical inputs provided by the user 102 to the input devices 106, 108, 110 and 112 are translated by transducers (not shown) into electrical signals which are fed into a processor or computer 114. The processor 114 in one embodiment includes a microprocessor (not shown) such as the one described in U.S. Pat. No. 5,618,178 entitled "Vehicle Simulator with Low Frequency Sound Feedback," which is hereby incorporated by reference. The processor 114 executes computer software which is stored in a memory (not shown) such as read-only memory (ROM) chips. The computer software executed by the computer 114 is logically organized to include a control process 120.

The control process 120 receives digitized signals from the input devices 106, 108, 110 and 112. The control process 120 then passes data from these digitized signals, across a data path 118, to a model process 116 that models the velocity and acceleration vectors to determine position data of the simulated car. The position data is made available, across the data path 118, back to the control process 120. The control process 120 uses the new position of the car, and initiates signals to drive a video display 122, general sound speakers 123 and engine noise speakers 124, and an instrument panel 130.

The control process 120 further provides a user viewpoint into a graphical representation of the vehicle universe. In the preferred vehicle simulation embodiment, the computer 114 generates polygon graphics to the video display 122. The video display 122 may include a plurality of video devices arranged in a semi-circle to give the user 102 a simulated view similar to that of a real car. This arrangement is known in the art and described in U.S. Pat. No. 5,275,565, entitled "Modular Display Simulator and Method," which is hereby incorporated by reference.

The video display 122 preferably generates a color, three-dimensional graphical representation of the environment, i.e., the user's perspective of a graphical universe including items such as a roadway. The speakers 123 and 124 produce sounds such as gear changes, engine revving, skidding, and so on. The instrument panel 130 includes a speedometer to indicate the speed of the simulated vehicle, an indicator for the gear selected by using the shifter 110 and various other indicator lights. Thus, the user 102 is presented with real-time feedback from the output devices 122, 123, 124, and 130 that is personalized according to his own individual performance and what he encounters in the simulated universe.

The control process 120 further provides feedback to simulate the feeling of a steering wheel in a real automobile while being driven. This is preferably accomplished in the same manner as described in assignee's patent "Control Device such as a Steering Wheel for Video Vehicle Simulator With Realistic Feedback Forces", U.S. Pat. No. 5,044,956 which is hereby incorporated by reference.

The basic operation of the simulator system 100 will now be described. The computer 114 generates a graphics universe to be displayed to the user 102 via the video display 122 along with associated sounds via the speakers 123, 124. The user 102, in response to what he sees in the video display 122 and what he hears from the speakers 123, 124 manipulates the driving controls to thereby drive the simulated vehicle.

In response to the user inputs provided via the input devices 106, 108, 110 and 112, the control process 120 of the computer 114 passes data to the model process 116 via the data path 118 which enables the model process 116 to model the velocity and acceleration vectors of the simulated vehicle thereby determining the Cartesian coordinates of the vehicle. This data is then passed back to the control process 120 via the data path 118 and is then used by the control process 120 to provide additional signals to the user 102. For example, the Cartesian coordinates as determined by the model process 116 may determine that the user 102 has driven the simulated vehicle over a cone in the simulated universe, hence the control process 120 causes the general sound speakers 123 to generate an appropriate noise as well as cause the steering wheel 112 to vibrate in the hands of the user 102 in response to hitting the cone.

Music and collision sounds, such as sounds associated with the observer car colliding with barriers, cones, buildings and the like, are generated if the computer 114 determines that the simulated vehicle has collided with something and played through general sound speakers 123. Engine noise sounds such as revving the engine are generated by the computer according to the driver inputs 106, 108, 110, and 112 as described in the prior art and played through the engine noise speakers 124.

Figure 2:
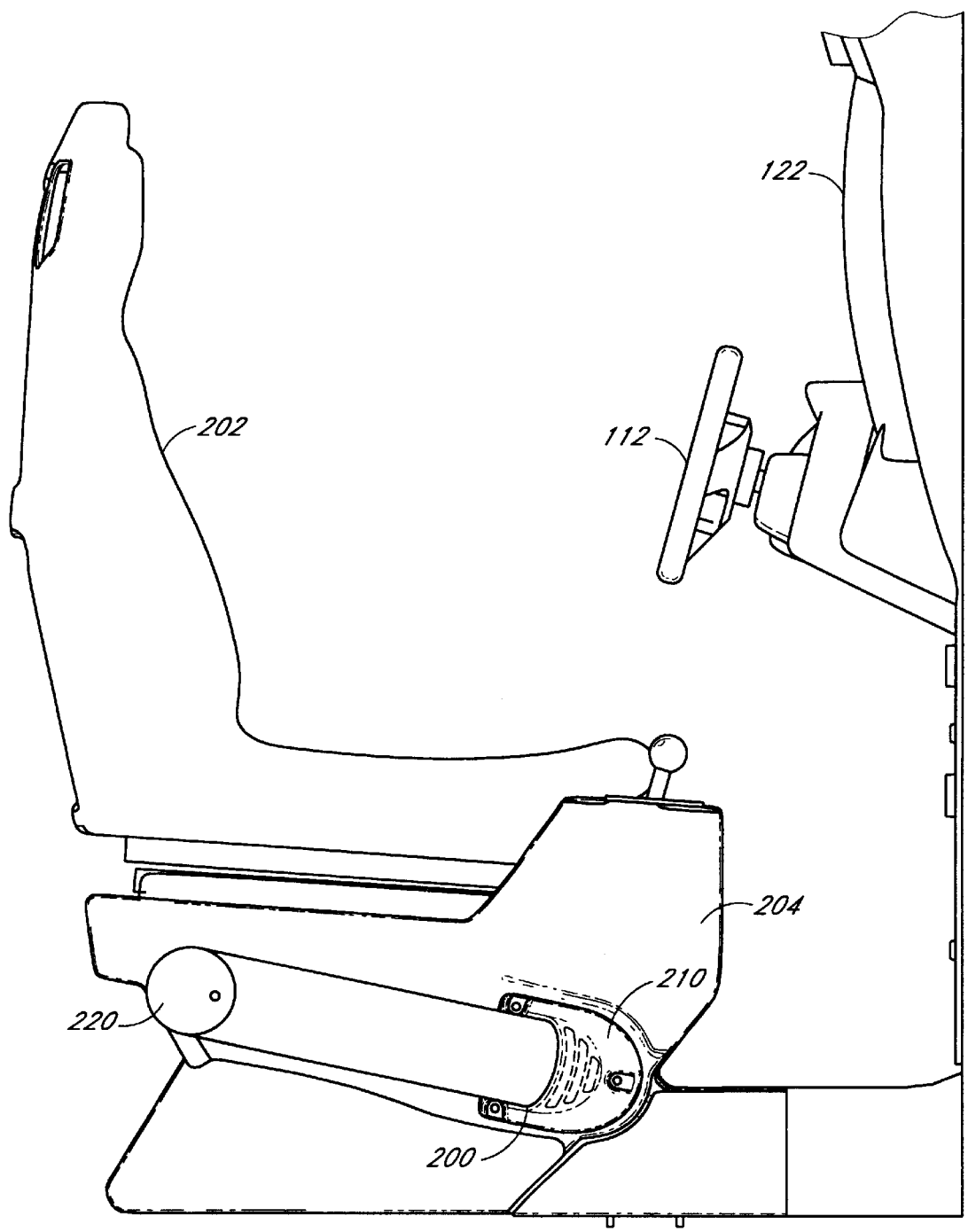
FIG. 2 is a side elevation view of one preferred embodiment of a sound resonant chamber assembly connected to a seat housing and a seat.

FIG. 2 is a side elevation diagram of one preferred embodiment of a sound resonant chamber assembly 200 according to the invention. FIG. 2 displays a seat 202 and a seat housing 204. The sound resonant chamber assembly 200 is attached to the housing 204 so that it is positioned below the seat 202. The sound resonant chamber assembly 200 includes a speaker cover 210 and a sound tube 220. The sound tube 220 extends from the speaker cover 210 towards the rear of the housing 204 and is substantially parallel with the side of the housing 204. The purpose of the sound resonant chamber assembly 200 is to provide the user 102 (FIG. 1) with meaningful and realistic automobile sounds such as the sounds one would hear from a car exhaust.

The seat 202 is preferably made of a lightweight plastic or upholstered wood, upon which the user 102 (FIG. 1) will sit while operating the system. The housing 204 is preferably made of a durable metal or plastic. The seat 202 is movably mounted on the housing 204, containing a seat adjust mechanism (not shown). The seat adjust mechanism can be of any type known in the art which permits the user 102 (FIG. 1) to adjust the seat 202 into a preferred position relative to the steering wheel 112 and the video display 122.

Figure 3:
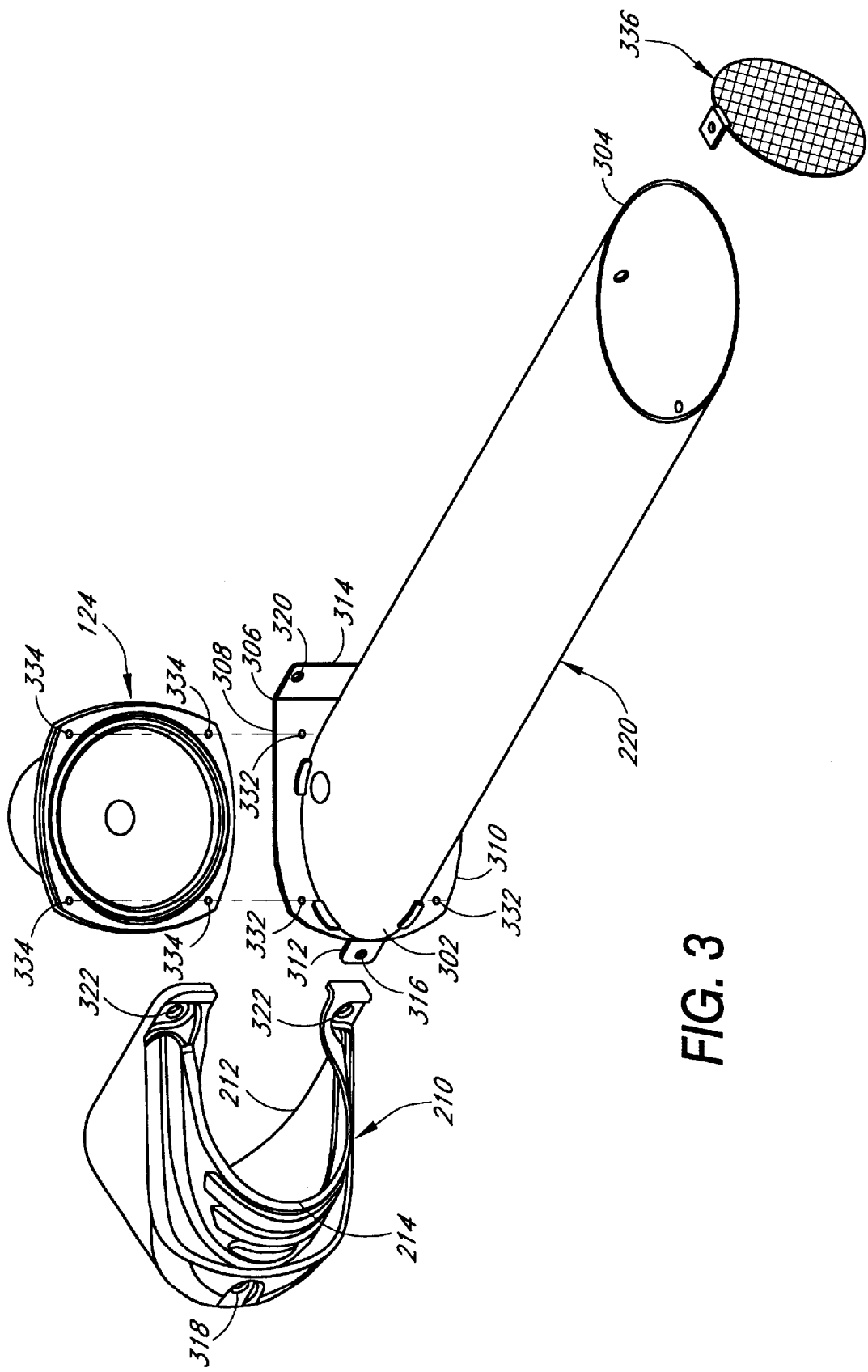
FIG. 3 is an exploded perspective view of an embodiment of a sound resonant chamber assembly of the invention.

FIG. 3 is an exploded perspective view of an embodiment of the sound resonant chamber assembly 200 and shows that the speaker cover 210 has a substantially horseshoe-shaped base 212 and a horseshoe-shaped mouth 214. Extending from the mouth 214 is the sound tube 220. The sound tube 220 can be varying lengths, such as between one foot and four feet in length. The sound tube 220 can be a circular tube having varying diameters, such as between two inches and six inches. Alternatively, the sound tube 220 can have an elliptical or other shape. Preferably, the sound tube 220 has a diameter of at least three inches. In one preferred embodiment the sound tube 220 is a substantially circular tube with a four inch diameter and is approximately 21 inches long.

The sound tube 220 has two ends 302, 304 that can be cut at 45-degree angles so that the openings at the ends 302, 304 form ellipsis. A base plate 306 is attached to the first end 302 of the sound tube 220. The base plate 306 has a top flange 308 and a bottom flange 310 opposite the top flange 308 that extend slightly beyond the outer circumference of the sound tube 220. The base plate 306 with flanges 308, 310 allow for a connecting surface as will be discussed below. A tab 312 extends from one side of the base plate 306. A side flange 314 extends from a side of the base plate 306 opposite the tab 312 and is substantially parallel with the sound tube 220. When in the operable position, a hole 316 in the tab 312 is aligned with a hole 318 in the speaker cover 210. Also, holes 320 in the side flange 314 are aligned with holes 322 in the speaker cover 210. Screws or other fastening devices can be inserted through holes 316 and 318, and holes 320 and 322 to attach the sound tube 220 to the speaker cover 210.

The engine noise speaker 124 is connected to the base plate 306 in such a way that the sounds produced by the speaker 124 are directed through the sound tube 220.

The speaker 124 is preferably a 5.25 inch full range 4 ohm speaker. Holes 332 in the top flange 308 and the bottom flange 310 align with holes 334 in the speaker 124 and screws or other fastening devices can be used to attach the speaker 124 to the base plate 306. Alternatively, other methods can be used to attach the speaker to the base plate such as an adhesive. The tab 312 and the side flange 314 are angled so that when the speaker cover 210 is connected to the housing 204, the sound tube 220 is adjacent to and parallel with the housing 204 as shown back in FIG. 2. The rear side of the speaker 124 is vented into the seat housing 204 forming an infinite baffle. A circular grate 336 with substantially the same diameter as the sound tube 220 is inserted in the second end 304 of the sound tube 220 to prevent debris from collecting in the sound tube 220.

In one embodiment, the sound tube 220 and the speaker cover 210 are fabricated from CR1010 commercial quality steel and are chrome-plated. This provides the desired tonal quality, and when positioned on the housing as in FIG. 2, gives the appearance of an actual hot rod car exhaust pipe. Alternatively, other materials may be used such as plastic, cardboard, etc.

In one embodiment of the invention, the simulated driving system 100 can include two sound resonant chamber assemblies 200 connected on opposite sides of the housing 204. The speakers 124 in each sound resonant chamber assemblies 200 can be wired in phase so the sound from the speakers 124 is balanced. In one embodiment, the two speakers 124 could be driven from two different sources, creating a stereo sound, further enhancing the simulation effect.

The sound resonant chamber assembly 200 enhances the tonal quality of the engine noise sounds produced by the engine noise speaker 124 because the sound resonates from the sound tube 220 and is focused much like sound from an actual engine exhaust pipe. This creates a more realistic sound presentation to the driver.

Although preferred embodiments of the invention have been principally shown and described as relating to a racing arcade game, the present invention could also be used in other type of vehicle arcade games, such as a motorcycle or a jet fighter game, and could also be used in a vehicle simulator such as a simulated driving system.

Although the above detailed description has shown, described and pointed out fundamental novel features of the invention as applied to various embodiments, it will be understood that various omissions and substitutions and changes in the form and details of the device illustrated may be made by those skilled in the art, without departing from the spirit of the invention.

What is claimed is:

1. A vehicle simulation system which produces sounds replicating sounds of a vehicle being simulated, the system comprising:
    a seat, wherein a driver sits during operation of the vehicle simulation system;
    a plurality of input devices corresponding to input devices of the vehicle simulated by the vehicle simulation system;
    a computer for receiving input signals from the input devices;
    a control process executed by the computer for selectively converting the input signals into a plurality of signals representing engine sounds;
    a speaker responsive to the signals for producing engine sounds; and
    a sound resonant chamber comprising a sound tube attached to the speaker for directing the engine sounds.

2. The system of claim 1 wherein the sound tube is between one foot and four feet in length.

3. The system of claim 1 wherein the sound tube is a circular tube having a diameter between three inches and five inches.

4. A sound resonant system of a vehicle simulation system which produces sounds replicating sounds of a vehicle being simulated, the system comprising:
    a plurality of input devices for controlling the operation of a simulated vehicle;
    a computer comprising a control process which receives signals from at least one of said plurality of input devices and initiates signals to drive a video display of the simulated vehicle, the computer, responsive to the control process, for determining engine characteristics information of the simulated vehicle and for providing a signal representing the engine characteristics during operation of said simulated vehicle;
    an engine sound speaker responsive to the signal produced by the computer for producing engine sounds;
    a sound tube with a first opening positioned proximate the engine sound speaker, for directing the engine sounds from the speaker; and
    a general sound speaker responsive to the computer for producing general sounds associated with the actions of the simulated vehicle.

5. A vehicle simulation system which produces sounds replicating sounds of a vehicle being simulated, the system comprising:
    means for providing a plurality of simulated input devices for controlling the operation of the simulated vehicle in a simulated environment;
    means for producing sound signals representing engine conditions during operation of the simulated vehicle in the simulated environment; and
    means for directing the sound signals through a sound tube to provide a realistic sound which representative of engine sounds produced by the simulated vehicle.

6. A method of realistically producing sounds representative of engine sounds produced during the operation of a simulated vehicle in a simulated driving game, the method comprising:
    providing a plurality of simulated input devices for controlling the operation of a simulated vehicle;
    producing sound signals representing engine sounds reflecting operation of the simulated vehicle; and
    directing the sound signals through a resonant sound tube to provide a realistic sound which is representative of engine sounds produced by the simulated vehicle.

7. A vehicle simulation system which produces sounds replicating sounds of a vehicle being simulated, the system comprising:
    a housing;
    a computer for producing a simulation of a vehicle and generating signals representative of engine sounds corresponding to operation of said vehicle;
    a sound source positioned in the housing and responsive to the signals for producing engine sounds; and
    a sound resonant tube connected to the sound source so as to enhance and direct the engine sounds from said sound source.

8. A sound resonant system of a vehicle simulation system which produces sounds replicating sounds of a vehicle being simulated, the system comprising:
    a plurality of input devices for controlling the operation of a simulated vehicle;

a computer, the computer having a control process which receives signals from at least one of said plurality of input devices and initiates signals to drive a video display of the simulated vehicle, the computer further configured to be responsive to the control process to determine engine characteristics information of the simulated vehicle and to provide a signal representing the engine characteristics during operation of the simulated vehicle:

a speaker responsive to the signal produced by the computer for producing engine noise sounds; and a sound resonant chamber comprising a tube attached to the speaker for directing the sound from the speaker.

9. The simulator of claim 8 wherein the tube is between one foot and four feet in length.

10. The system of claim 8 wherein the tube has a circular diameter between three inches and five inches.

11. A method of realistically producing sounds representative of engine sounds produced during the operation of a simulated vehicle in a simulated driving game, the method comprising:

providing a plurality of simulated input devices for controlling the operation of a simulated vehicle, producing sound signals representing engine sounds reflecting operation of the simulated vehicle; and directing the sound signals through a sound resonant chamber comprised of a tube attached to a speaker to provide a realistic sound which is representative of engine sounds produced by the simulated vehicle.

12. The method of claim 11, wherein the tube is between one foot and four feet in length.

13. The method of claim 11 wherein the sound tube has a circular diameter between three inches and five inches.

* * * * *